(12) United States Patent
Zhu et al.

(10) Patent No.: US 11,092,218 B2
(45) Date of Patent: Aug. 17, 2021

(54) GOOD-ORIENTATION, LOW-DRIFT MICRO-MOVEMENT SUBASSEMBLY FOR ANGLE ADJUSTMENT

(71) Applicant: Shanghai Institute of Optics And Fine Mechanics, Chinese Academy of Sciences, Shanghai (CN)

(72) Inventors: Jianqiang Zhu, Shanghai (CN); Gengxiu Tang, Shanghai (CN); Zhigang Liu, Shanghai (CN); Lifeng Du, Shanghai (CN); Xiangyang Pang, Shanghai (CN); Chao Zhang, Shanghai (CN)

(73) Assignee: Shanghai Institute of Optics And Fine Mechanics, Chinese Academy of Sciences, Shanghai (CN)

( * ) Notice: Subject to any disclaimer, the term of this patent is extended or adjusted under 35 U.S.C. 154(b) by 132 days.

(21) Appl. No.: 16/514,911

(22) Filed: Jul. 17, 2019

(65) Prior Publication Data

US 2020/0292036 A1 Sep. 17, 2020

(30) Foreign Application Priority Data

Mar. 15, 2019 (CN) .......................... 201910196403.0

(51) Int. Cl.
*F16H 25/20* (2006.01)
*F16H 57/04* (2010.01)

(52) U.S. Cl.
CPC ..... *F16H 25/2003* (2013.01); *F16H 57/0464* (2013.01); *F16H 57/0497* (2013.01)

(58) Field of Classification Search
CPC ............... F16H 57/0426; F16H 57/043; F16H 25/2003; F16H 57/0464; F16H 57/0497; Y10T 74/18744
USPC .......................................................... 359/829
See application file for complete search history.

(56) References Cited

U.S. PATENT DOCUMENTS

| | | | |
|---|---|---|---|
| 6,016,230 A * | 1/2000 | Nunnally | G02B 7/004 359/819 |
| 6,186,016 B1 | 2/2001 | Cable | |
| 7,400,802 B2 | 7/2008 | Wyatt et al. | |
| 7,421,918 B2 | 9/2008 | Cable et al. | |
| 7,688,528 B2 * | 3/2010 | Michael | G02B 7/1824 359/811 |
| 7,982,980 B2 | 7/2011 | Rigney | |
| 8,174,778 B2 * | 5/2012 | Taki | G02B 7/023 359/829 |
| 8,403,591 B2 * | 3/2013 | Kozak | G02B 7/00 403/362 |
| 8,441,748 B2 | 5/2013 | Rigney | |

* cited by examiner

*Primary Examiner* — Bobby Rushing, Jr.
(74) *Attorney, Agent, or Firm* — Mei & Mark LLP; Manni Li

(57) ABSTRACT

A good-orientation, low-drift micro-movement subassembly for angle adjustment as a precise driving screw for angle adjustment, comprising a slotted knurling handle, a turnbuckle and a central cylindrical shaft. The invention is precise for linear displacement, good orientation, low-drift, stable and reliable adjustment, which can be used for a variety of precision-oriented, small drift, precision micro-angle adjustment of the drive screw.

4 Claims, 4 Drawing Sheets

GOOD-ORIENTATION, LOW-DRIFT MICRO-MOVEMENT SUBASSEMBLY FOR ANGLE ADJUSTMENT

CROSS-REFERENCE TO RELATED APPLICATIONS

The subject application claims priority on Chinese patent application no. CN 201910196403.0 filed on Mar. 15, 2019 in China. The contents and subject matter of the Chinese priority application is incorporated herein by reference.

FIELD OF TECHNOLOGY

The present invention relates to micro-movement subassembly for angle adjustment, particularly, micro-movement subassembly that provides good orientation and low drift.

BACKGROUND OF INVENTION

The micro-movement screw subassembly for linear displacement is assembled by screw and screw nut with a certain amount of grease, and the movement for lead and gear is combined together. However, a gap error always exists between the screw and screw nut, which is caused by an error in machine processing for triangular thread surfaces and axial face as well as screw pitch deviation. Generally, when the error is more than 10 μm, it causes inaccurate screw leading linear displacement. Conventionally, the first solution is to add lubricating grease to the threaded mating surface, and the second solution is to open an elastic groove on the screw shaft to reduce the gap error between the screw and the screw nut. The first solution produces piston effect of flexible contact between the screw thread pairs as the greases fills in the gap. The phenomenon makes the relative position of the screw thread pairs susceptible to the influence of environmental changes (such as temperature change or vibration shock), leading to small changes of relative position, namely drift. The changes of the relative position between the screw and screw nut directly influences the position of the optical parts relative to the optical system. Even very small changes of the position may have a great impact on the optical system in terms of the optical parts applied in the high power laser optical system. Besides, the addition of grease does not improve the poor orientation of the screw shaft itself. The second solution does not work well either, while gap is reduced but the wear is large because of hard contact between the screw thread pairs and the leading accuracy is still not good.

SUMMARY OF THE INVENTION

The present invention provides a good-orientation, low-drift micro-movement subassembly that is used as a precise driving screw for angle adjustment so as to reduce the transmission gap for adjusting the angle, improve the orientation property of the mechanism, reduce the drift effects caused by piston effect because of the grease in the thread pair, and effectively improve the stability of the mechanism. The subassembly of the present invention is precise for linear displacement, good orientation, low drift, stable and reliable adjustment, which can be used for a variety of precision-oriented, small drift, precision micro-angle adjustment of the drive screw.

The micro-movement screw subassembly of the present invention comprises a slotted knurling handle, a turnbuckle, and a central cylindrical shaft.

In the present invention, the slotted knurling handle is a cylindrical stepped cylinder which can be divided into a central cylindrical countersink section, an internally threaded hole section and an unthreaded hole section from the inside to the outside. The inner wall of the internally threaded hole section has internal thread and through grooves which are evenly distributed along the circumferential direction and extends through the entire internal threaded hole.

In the present invention, the turnbuckle is a three-step hollow cylindrical rod divided into a small stage, a middle stage, and a large stage, and external threads are machined on the outer surfaces of the small stage and the large stage.

In the present invention, the central cylindrical shaft is a cylindrical rod. One end of the central cylindrical shaft fits in transition or interference with the central cylindrical countersink portion of the slotted knurling handle, the external thread of the small stage of turnbuckle is assembled with the inner thread of the slotted knurling handle, and the middle stage fits with the unthreaded hole of the slotted knurling handle.

In the present invention, the outer surface of the middle stage of the turnbuckle is marked with the lengthy range of the stroke along the axial central line, the outer end portion of the unthreaded hole of the slotted knurling handle is an outer surface with a slope, and the outer circle surface of the slope is marked with the same scale according to the pitch, and the middle stage of the turnbuckle is in clearance fit with the unthreaded hole of the slotted knurling handle.

In the present invention, the one end of the central cylindrical shaft is a flat surface and the other end is a spherical surface which is used to point contact with the dome-driven member.

In the present invention, the thread fits between the external thread of the small stage of the turnbuckle and the inner threaded hole of the slotted knurled handle is filled with grease. With the unidirectional preload the excess grease flows into the through slot, generating the one-way tight fit of the screw tooth surface. The result improves the non-rigid contact of piston effect between the screw tooth surfaces due to the grease filling and the drift caused by the existence of the thread pair gap.

The assembly of the present invention may be adjusted as follows. The precision cylindrical surface of the central cylindrical shaft fits with the precision cylinder inner hole of the turnbuckle to realize the precision leading function. The external thread of the turnbuckle is coated with grease. The turnbuckle is assembled with the slotted knurling handle by thread sequentially. Then one end of the central cylindrical shaft is connected with the central cylinder of the slotted knurling handle through a transition or interference fit. By turning the slotted knurling handle back and forth, the excess grease in the threaded pair flows into the through groove of the slotted knurling handle to generate the one-way tight fit of the screw tooth surface and improve the piston effect produced by the non-rigid contact. At the same time, due to the absorption of grease on the surface of the screw tooth a small amount of grease will be carried into the one-way tight fit surfaces during the adjustment to achieve lubrication and smooth operation without hysteresis. Once the turnbuckle is fixed on when used, and the slotted knurling handle is turned clockwise, the central cylindrical shaft is driven forward precisely along the thread. When the slotted knurling handle is turned in the opposite direction, the central cylindrical shaft is driven backward precisely along the thread. In the angle adjustment mechanism, the present invention can realize precision adjustment of the angle.

The present invention shows that the displacement is A (A represents the adjustment range). The leading accuracy depends on the fine assembly of the cylindrical shaft, and as the accuracy of the machine processing may reach to several micrometers, the leading accuracy may reach to several micrometers as well. Thus, the invention is precise for linear displacement, good orientation, low-drift, stable and reliable adjustment, which can be used for a variety of precision-oriented, small drift, precision micro-angle adjustment of the drive screw.

BRIEF DESCRIPTION OF THE DRAWINGS

FIG. 1A is a section view and FIG. 1B is a cross section view along the A-A line in FIG. 1A of the micro-movement subassembly.

FIG. 2A is a section view of the slotted knurling handle, FIG. 2B is the cross section view along the A-A line in FIG. 2A of the slotted knurling handle, and FIG. 2C is the surface view of the handle.

FIG. 3A is a section view of the turnbuckle, and FIG. 3B is a view of the appearance of the turnbuckle.

DETAILED DESCRIPTION OF THE INVENTION

In connection with the attached figures, the present invention is further explained in details.

As shown in FIGS. 1 to 7, the good-orientation, low-drift micro-movement subassembly for angle adjustment comprises a slotted knurling handle 1, a turnbuckle 2, and a central cylindrical shaft 3.

Figures 1A, 1B:
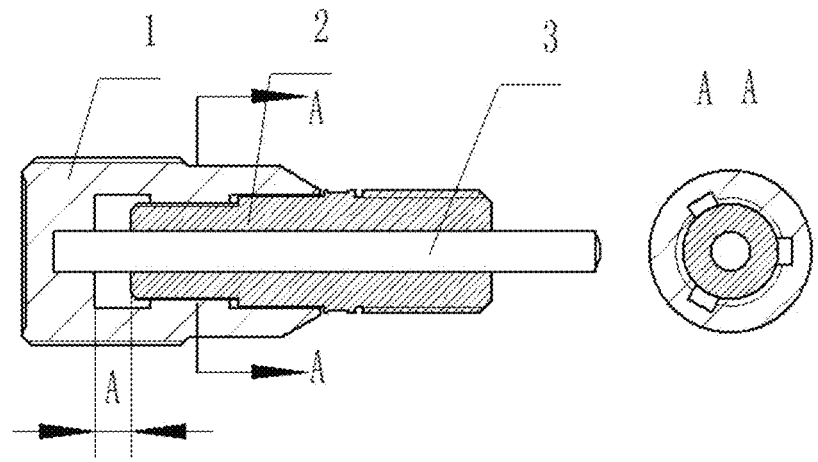
FIGS. 1A and 1B show the micro-movement subassembly for angle adjustment of the present invention, where
Figures 2A, 2B:
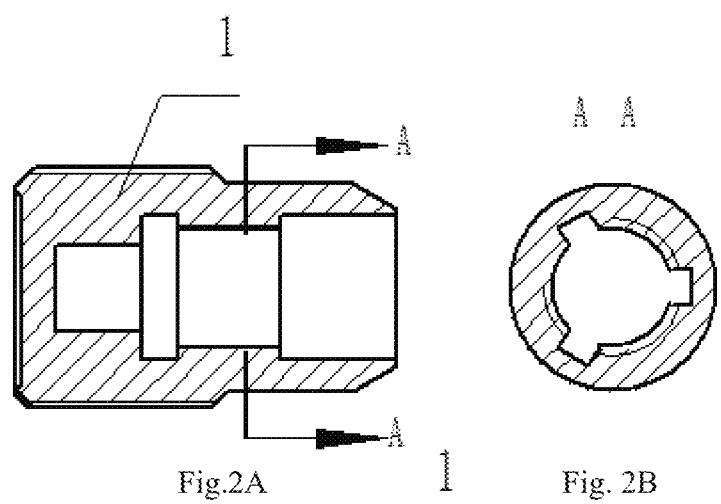
FIGS. 2A to 2C show the slotted knurling handle of the present invention, where
Figure 2C:
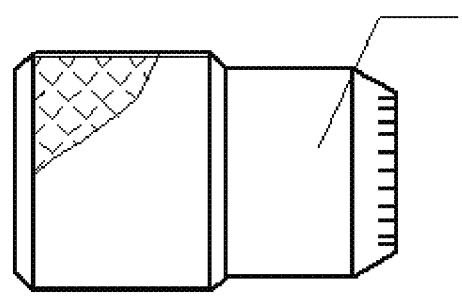

As shown in FIGS. 2A to 2C, the slotted knurling handle 1 is a cylindrical stepped cylinder which can be divided into a central cylindrical countersink section, an internally threaded hole section and an unthreaded hole section from the inside to the outside. The inner wall of the internally threaded hole section has internal thread and through grooves which are evenly distributed along the circumferential direction and extends through the entire internal threaded hole.

Figure 3A:
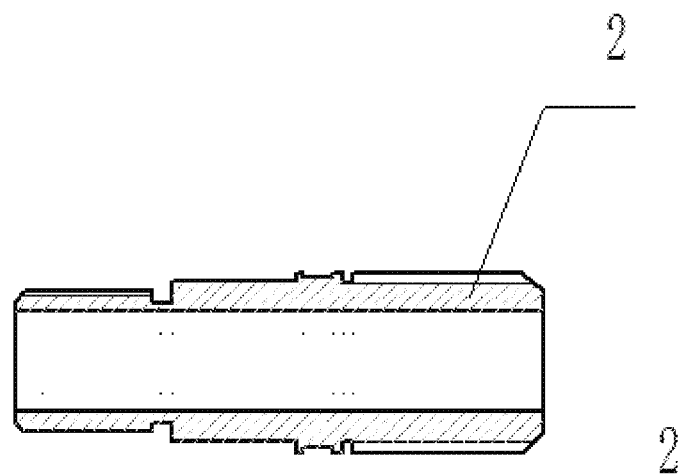
FIGS. 3A and 3B show the turnbuckle of the present invention, where
Figure 3B:
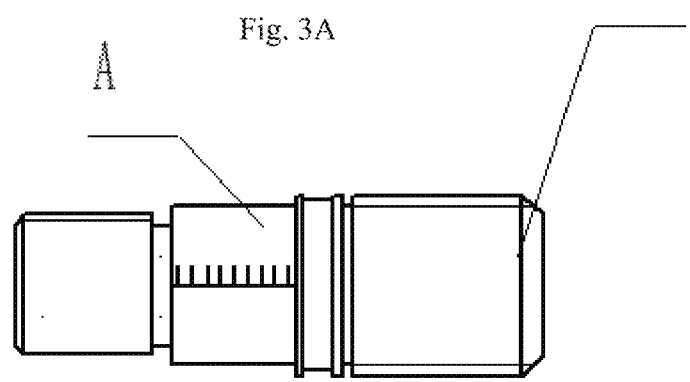

As shown in FIGS. 3A and 3B, the turnbuckle 2 is a three-step hollow cylindrical rod divided into a small stage, a middle stage and a large stage, and external threads are machined on the outer surfaces of the small stage and the large stage.

Figure 4:
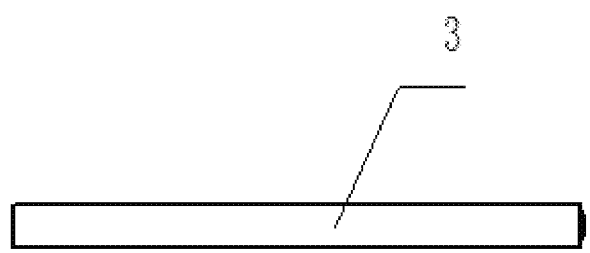
FIG. 4 shows the central cylinder of the present invention.

As shown in FIG. 4, the central cylindrical shaft 3 is a cylindrical rod. One end of the central cylindrical shaft 3 fits in transition or interference with the central cylindrical countersink portion of the slotted knurling handle 1, and the external thread of the small stage of turnbuckle 2 is assembled with the inner thread of the slotted knurling handle 1, and the middle stage fits with the unthreaded hole of the slotted knurling handle 1.

The outer surface of the middle stage of the turnbuckle 2 is marked with the lengthy range of the stroke along the axial central line, the outer end portion of the unthreaded hole of the slotted knurling handle is an outer surface with a slope, and the outer circle surface of the slope is marked with the same scale according to the pitch, and the middle stage of the turnbuckle 2 is in clearance fit with the unthreaded hole of the slotted knurling handle 1.

One end of the central cylindrical shaft 3 is a flat surface and the other end is a spherical surface which is used to point contact with the dome-driven member.

Figure 5:
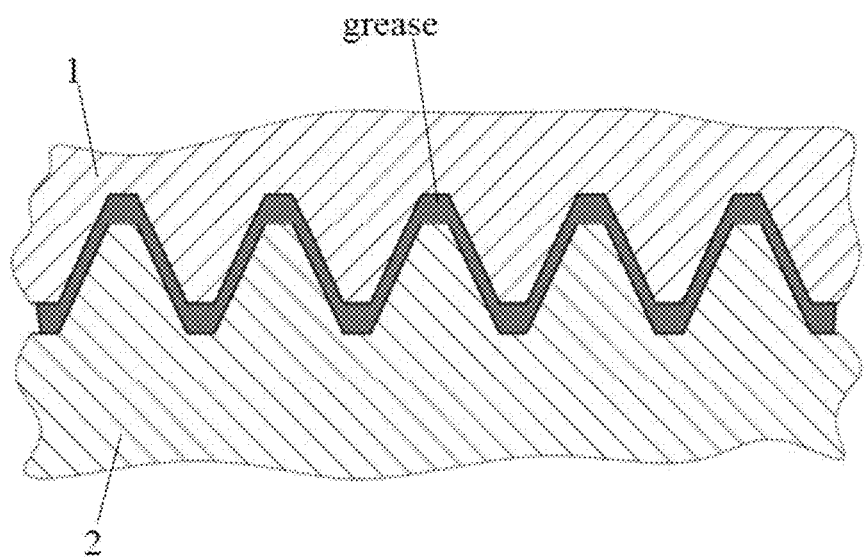
FIG. 5 shows the screw tooth surfaces of ungrooved screw pairs with grease added and without one-way preload in the present invention.
Figure 6:
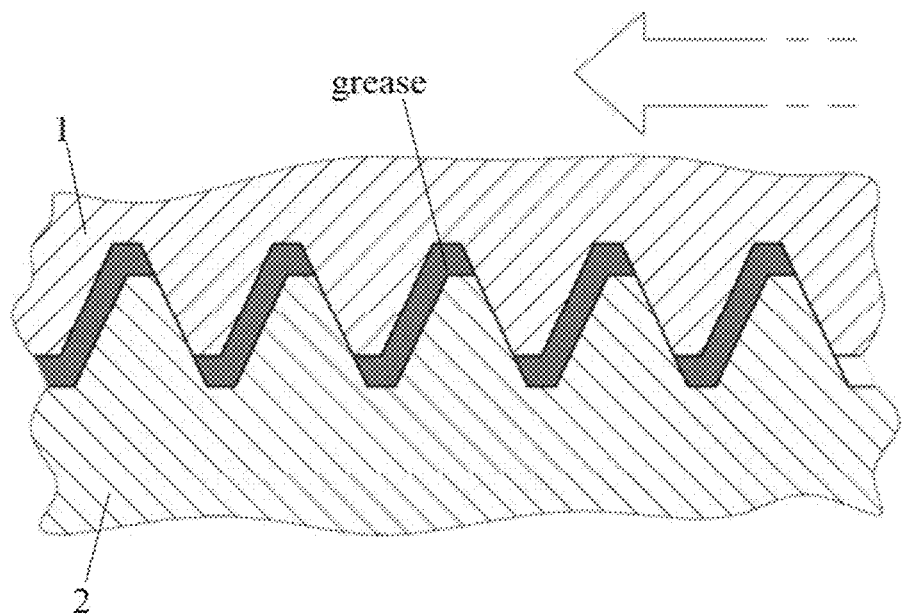
FIG. 6 shows the screw tooth surfaces of grooved screw pairs with excess grease flowing into grooves under one-way preload in the present invention.
Figure 7:
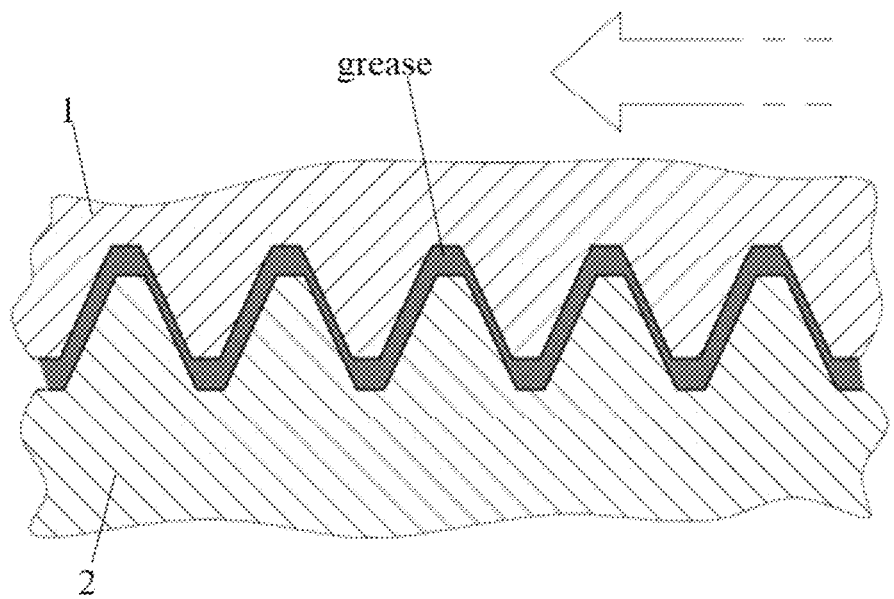
FIG. 7 shows the screw tooth surfaces of ungrooved screw pairs with grease added and one-way preload in the common structures.

The assembly of the present invention may be adjusted as follows. The precision cylindrical surface of the central cylindrical shaft 3 fits with the precision cylinder inner hole of the turnbuckle 2 to realize the precision leading function. The external thread of the turnbuckle 2 is coated with grease. The turnbuckle 2 is assembled with the slotted knurling handle 1 by thread sequentially. Then one end of the central cylindrical shaft 3 is connected with the central cylinder of the slotted knurling handle 1 through a transition or interference fit. In the absence of tension, the gaps on both sides of the thread are filled with grease, just as shown in FIG. 5. When the assembly is installed in an optical mount, there is always a unidirectional force pulling the handle towards turnbuckle. By turning the slotted knurling handle 1 back and forth, the excess grease in the threaded pair flows into the through groove of the slotted knurling handle 1 under the unidirectional force to generate the one-way tight fit of the screw tooth surface and improve the piston effect produced by the non-rigid contact, just as shown in FIG. 6. At the same time, due to the absorption of grease on the surface of the screw tooth, a small amount of grease will be carried into the one-way tight fit surfaces during the adjustment to achieve lubrication and smooth operation without hysteresis. Just as shown in FIG. 7, if there is no through groove in the inner wall of the internally threaded hole of the handle, the excess grease in the thread gap under the unidirectional force will be subjected to pressure to form piston effect which situation is highly susceptible to temperature changes or shock, changing the distribution of the grease, and changing the relative position between the handle and the turnbuckle.

Once the turnbuckle 2 is fixed on when used, and the slotted knurling handle 1 is turned clockwise, the central cylindrical shaft 3 is driven forward precisely along the thread. When the slotted knurling handle 1 is turned in the opposite direction, the central cylindrical shaft 3 is driven backward precisely along the thread. In the angle adjustment mechanism, the present invention can realize precision adjustment of the angle.

The displacement is A (A represents the adjustment range). Experiment shows that the invention is precise for linear displacement, good orientation, low-drift, stable and reliable adjustment, which can be used for a variety of precision-oriented, small drift, precision micro-angle adjustment of the drive screw.

The scope of the present invention is not limited by the detailed descriptions, and one of ordinary skill in the art could modify and change of the micro-movement assembly without departing from the scope of the present invention.

We claim:

1. A micro-movement subassembly for angle adjustment, comprising
a slotted knurling handle,
a turnbuckle, and
a central cylindrical shaft, wherein the slotted knurling handle is a cylindrical stepped cylinder that comprises a central cylindrical countersink section, an internally threaded hole section, and an unthreaded hole section from inside to outside;

an inner wall of the internally threaded hole section of the slotted knurling handle has internal thread and through grooves are evenly distributed along a circumferential direction and extends through the entire internally threaded hole section;

the turnbuckle is a three-step hollow cylindrical rod having an axial central line and being divided into a small stage, a middle stage, and a large stage, and external threads are machined on outer surfaces of the small stage and the large stage;

the central cylindrical shaft is a cylindrical rod; and one end of the central cylindrical shaft fits in transition or interference with the central cylindrical countersink section of the slotted knurling handle, and the external thread of the small stage of turnbuckle is assembled with the inner thread of the slotted knurling handle, and the middle stage of the turnbuckle fits with the unthreaded hole section of the slotted knurling handle.

2. The micro-movement subassembly for angle adjustment according to claim 1, wherein outer surface of the middle stage of the turnbuckle is marked with a lengthy range of stroke along the axial central line, an outer end portion of the unthreaded hole of the slotted knurling handle is an outer surface with a slope, and the outer circle surface of the slope is marked with the same scale according to the stroke, and the middle stage of the turnbuckle is in clearance fit with the unthreaded hole of the slotted knurling handle.

3. The micro-movement subassembly for angle adjustment according to claim 1, wherein one end of the central cylindrical shaft is a flat surface and other end is a spherical surface being used to point contact with a dome-driven member.

4. The micro-movement subassembly for angle adjustment according to claim 1, wherein the thread fits between the external thread of the small stage of the turnbuckle and the inner threaded hole of the slotted knurled handle is filled with grease, whereby, with an unidirectional preload, excess grease flows into the through groove to generate a one-way tight fit of a screw tooth surface, improving the non-rigid contact by the grease filling and decreasing drift caused by existence of the thread fit clearance.

\* \* \* \* \*